US008113239B2

(12) United States Patent
Richards et al.

(10) Patent No.: US 8,113,239 B2

(45) Date of Patent: Feb. 14, 2012

(54) VENTED VALVE ASSEMBLY

(75) Inventors: James L. Richards, Dassel, MN (US); Loren L. Brelje, Glencoe, MN (US)

(73) Assignee: David S. Smith America, Inc., Lester Prairie, MN (US)

( * ) Notice: Subject to any disclaimer, the term of this patent is extended or adjusted under 35 U.S.C. 154(b) by 457 days.

(21) Appl. No.: 12/437,034

(22) Filed: May 7, 2009

(65) Prior Publication Data

US 2010/0282345 A1 Nov. 11, 2010

(51) Int. Cl.
*F16K 24/00* (2006.01)
*B67D 3/00* (2006.01)

(52) U.S. Cl. ........ 137/588; 137/587; 137/613; 222/482; 222/483; 222/484; 222/511; 222/478

(58) Field of Classification Search .................. 137/588, 137/587, 613, 614.11, 614.12; 222/482–484, 222/505, 506, 511, 478
See application file for complete search history.

(56) References Cited

U.S. PATENT DOCUMENTS

| | | | |
|---|---|---|---|
| 686,566 | A | 11/1901 | Wight |
| 833,420 | A | 10/1906 | Schutte |
| 1,228,837 | A | 6/1917 | Schulse |
| 1,749,970 | A | 3/1930 | Collins |
| 2,034,845 | A | 3/1936 | Stedwell |
| 2,046,474 | A | 7/1936 | Maggenti |
| 2,112,640 | A | 3/1938 | Wheaton |
| 2,113,046 | A | 4/1938 | Freemon |
| 2,197,352 | A | 4/1940 | Terkel |
| 2,328,746 | A | 9/1943 | Schwarzkopf |
| 2,337,276 | A | 12/1943 | Sanchis |
| 2,502,858 | A | 4/1950 | Klix |
| 2,582,752 | A | 1/1952 | Harr |
| 2,589,622 | A | 3/1952 | McCabe |
| 2,661,018 | A | 12/1953 | Snyder |
| 2,664,096 | A | 12/1953 | Murdock et al. |
| 2,669,413 | A | 2/1954 | Hobbs |

(Continued)

FOREIGN PATENT DOCUMENTS

EP 0043698 A1 1/1982

(Continued)

OTHER PUBLICATIONS

International Search Report for International Application No. PCT/US2010/033835, mailed Aug. 5, 2010.

*Primary Examiner* — Dinh Q Nguyen
*Assistant Examiner* — Joel Zhou
(74) *Attorney, Agent, or Firm* — Vidas, Arrett & Steinkraus, P.A.

(57) ABSTRACT

In some embodiments, a vented valve assembly for attachment to a rigid container may include one or more of the following features: (a) a unitary tubular valve body of a generally cylindrical hollow form and having a liquid inlet end, and (b) a second end and a liquid outlet port, said liquid inlet end adapted for connection to a male spout on a wall of the rigid container, said liquid outlet port being exterior to the wall of the rigid container when the liquid inlet end is affixed to the spout, the valve body further including an air vent opening formed through a wall of the tubular valve body leading to a channel affixed to an inner wall of the tubular valve body, the channel having one open end.

20 Claims, 4 Drawing Sheets

U.S. PATENT DOCUMENTS

| | | | | |
|---|---|---|---|---|
| 2,702,563 | A | 2/1955 | Snyder et al. | |
| 2,712,323 | A | 7/1955 | Snyder et al. | |
| 2,842,291 | A | 7/1958 | Duval et al. | |
| 2,915,224 | A | 12/1959 | Beall, Jr. | |
| 3,033,247 | A | 5/1962 | Beall, Jr. | |
| 3,193,247 | A | 7/1965 | Pool et al. | |
| 3,219,072 | A | 11/1965 | Lau | |
| 3,268,123 | A | 8/1966 | Spatz | |
| 3,334,858 | A | 8/1967 | Hay | |
| 3,372,846 | A | 3/1968 | Berkus | |
| 3,401,850 | A | 9/1968 | Anderson | |
| 3,405,848 | A | 10/1968 | Damrel | |
| 3,432,080 | A | 3/1969 | Venus, Jr. | |
| 3,459,212 | A | 8/1969 | Campion, Sr. | |
| 3,506,160 | A | 4/1970 | Forim | |
| 3,537,622 | A | 11/1970 | Venus, Jr. | |
| 3,570,595 | A | 3/1971 | Berryman | |
| 3,595,445 | A | 7/1971 | Buford et al. | |
| 3,606,096 | A | 9/1971 | Campbell | |
| 3,752,177 | A | 8/1973 | Nordskog | |
| 3,863,673 | A * | 2/1975 | Sitton | 137/614.11 |
| 4,295,583 | A | 10/1981 | Schurr | |
| 4,314,658 | A | 2/1982 | Laauwe | |
| 4,452,425 | A | 6/1984 | Lucking | |
| 4,471,807 | A * | 9/1984 | Lucking et al. | 137/614.19 |
| 4,475,566 | A | 10/1984 | Haines | |
| 4,555,048 | A | 11/1985 | Hamman et al. | |
| 4,611,627 | A | 9/1986 | Eidsvoog et al. | |
| 4,618,078 | A | 10/1986 | Hamman et al. | |
| 4,687,123 | A | 8/1987 | Hyde | |
| 4,693,400 | A | 9/1987 | Frahm et al. | |
| 4,696,322 | A | 9/1987 | Knapp et al. | |
| 4,722,463 | A | 2/1988 | Anderson | |
| 4,724,074 | A | 2/1988 | Schaupp | |
| 4,887,792 | A | 12/1989 | Kuo | |
| 4,898,308 | A | 2/1990 | Rudick | |
| 4,930,689 | A | 6/1990 | Stumpf | |
| 5,211,313 | A | 5/1993 | Lucking et al. | |
| 5,332,127 | A | 7/1994 | White | |
| 5,337,775 | A * | 8/1994 | Lane et al. | 137/68.29 |
| 5,405,058 | A | 4/1995 | Kalis et al. | |
| 5,606,989 | A | 3/1997 | Roll et al. | |
| 5,615,809 | A | 4/1997 | Feer et al. | |
| 5,769,275 | A | 6/1998 | Boehmer et al. | |
| 5,927,565 | A | 7/1999 | Paczonay | |
| 5,992,462 | A | 11/1999 | Atkinson et al. | |
| 6,155,464 | A | 12/2000 | Vachon | |
| 6,258,269 | B1 | 7/2001 | Knight | |
| 6,296,157 | B1 | 10/2001 | Erb | |
| 6,360,925 | B2 | 3/2002 | Erb | |
| 6,364,178 | B1 | 4/2002 | Paczonay | |
| 6,378,742 | B1 | 4/2002 | Rohr et al. | |
| 6,401,752 | B1 * | 6/2002 | Blackbourn et al. | 137/588 |
| 6,446,845 | B1 | 9/2002 | Steiger | |
| 6,470,910 | B2 | 10/2002 | Blackbourn et al. | |
| 6,491,189 | B2 | 12/2002 | Friedman | |
| 6,648,186 | B2 | 11/2003 | Roethel et al. | |
| 6,896,158 | B2 | 5/2005 | Leray et al. | |
| 6,968,983 | B2 | 11/2005 | Laible | |
| 7,128,108 | B2 | 10/2006 | Nielsen | |
| 7,219,819 | B2 | 5/2007 | Halfacre et al. | |
| RE40,051 | E | 2/2008 | Stamey, Jr. et al. | |
| 7,425,102 | B1 | 9/2008 | Velliquette | |
| 7,455,281 | B2 | 11/2008 | Craft | |
| 7,461,762 | B2 | 12/2008 | Law et al. | |
| 7,513,395 | B2 | 4/2009 | Labinski et al. | |
| 2005/0263546 | A1 * | 12/2005 | Labinski et al. | 222/478 |

FOREIGN PATENT DOCUMENTS

| | | | |
|---|---|---|---|
| EP | 1190985 | A2 | 3/2002 |
| FR | 2068722 | A1 | 6/1988 |
| GB | 2333288 | A | 7/1999 |
| WO | 2005124204 | A2 | 12/2005 |
| WO | 2007068931 | A1 | 6/2007 |
| WO | 2007108025 | A1 | 9/2007 |

* cited by examiner

VENTED VALVE ASSEMBLY

I. FIELD OF THE INVENTION

Embodiments of the present invention generally relate to dispensing liquids. Particularly, embodiments of the present invention relate to dispensing valves for liquid containers. More particularly embodiments of the present invention relate to a dispensing valve incorporating an air vent whereby pressure within the container is equalized as the liquid contents are dispensed.

II. BACKGROUND

A variety of push-button actuated dispensing valves for dispensing liquids from a relatively large capacity container are known in the art. Where the dispensing valve or tap is used with a flexible wall container, it is not necessary the container be vented in any way because no pressure differential is created upon the emptying of the container through the tap.

However, with a rigid container, a system must be provided for equalizing the pressure differential created as contents of the rigid wall container are extracted. Such a vent may be remote from the dispensing valve and may merely comprise a capped opening in an upper wall of the container which, when uncapped, permits ingress of air into the volume as the liquid contents of the container are being dispensed. Also known in the prior art are self-venting valves eliminating the need for a separate, remote vent opening in the container. Listed below are a number of prior art patents relating to self-venting dispensing valve structures. Those with knowledge of dispensing art will recognize with the discussion below how embodiments of the present invention not only differ, but how embodiments of the present invention provide for a much more functional liquid dispenser.

| | |
|---|---|
| Wight | 686,566 |
| Terkel | 2,197,352 |
| Duval et al. | 2,842,291 |
| Freemon | 2,113,046 |
| Collins | 1,749,970 |
| Berkus | 3,372,846 |
| Damrel | 3,405,848 |
| Kalis, et al | 5,405,058 |
| Rudick | 4,898,308 |
| Stumpf | 4,930,689 |
| Vachon | 6,155,464 |
| Lucking et al. | 5,211,313 |
| White | 5,332,127 |
| Roll et al | 5,606,989 |
| Paczonay | 5,927,565 |
| Paczonay | 6,364,178 |
| Blackbourn et al. | 6,401,752 |
| Blackbourn et al. | 6,470,910 |
| Laible | 6,968,983 |
| Labinski et al. | 7,513,395 |
| Diego | WO 2007108025 |

It would be desirable to have a low cost, easy to assemble, reliably operating, mess-free dispensing valve for a rigid container, which will work well with both viscous and low viscosity liquids.

III. SUMMARY OF THE INVENTION

In some embodiments, a vented valve assembly for attachment to a rigid container may include one or more of the following features: (a) a unitary tubular valve body of a generally cylindrical hollow form and having a liquid inlet end, (b) a second end and a liquid outlet port, said liquid inlet end adapted for connection to a male spout on a wall of the rigid container, said liquid outlet port being exterior to the wall of the rigid container when the liquid inlet end is affixed to the spout, the valve body further including an air vent opening formed through a wall of the tubular valve body leading to a channel affixed to an inner wall of the tubular valve body, the channel having one open end, (c) a first valve member slidingly disposed in said channel and adapted to be moved between a blocking and an open position relative to said one open end of the channel, (d) a collapsible dome member secured to the valve body in covering relation to said second end of the tubular valve body and movable between a compressed and an expanded state, (e) an elongated, generally rigid stem member having a first end attachable to the collapsible dome and a second end joined to a second valve member adapted to cooperate with the liquid inlet end of the tubular valve body for uncovering the liquid inlet end when the collapsible dome is in the compressed state, said stem member supporting a third valve member for cooperating with the liquid outlet port, and a spring-type valve displacement pin carried on the second valve member for holding the first valve member closed when the collapsible dome is in the expanded state, (f) a longitudinal guideway formed on the channel and a follower projecting from the stem member into the guideway for preventing rotation of the stem member, and (g) finger accommodating indentations in said wall of the tubular valve body adjacent to said flange.

In some embodiments, a vented valve assembly may include one or more of the following features: (a) a unitary tubular valve body of a generally cylindrical hollow form and having a liquid inlet end, a second end and a liquid outlet port, said liquid inlet end adapted for connection to a male spout on a wall of the rigid container, said liquid outlet port being exterior to the wall of the rigid container when the liquid inlet end is affixed to the spout, the valve body further including an air vent opening formed through a wall of the tubular valve body leading to a channel affixed to an inner wall of the tubular valve body, the channel having one open end, (b) a first valve member slidingly disposed in said channel and adapted to be moved between a blocking and an open position relative to said one open end of the channel, (c) a collapsible dome member secured to the valve body in covering relation to said second end of the tubular valve body and movable between a compressed and an expanded state, (d) an elongated, generally rigid stem member having a first end attachable to the collapsible dome and a second end joined to a second valve member adapted to cooperate with the liquid inlet end of the tubular valve body for uncovering the liquid inlet end when the collapsible dome is in the compressed state, said stem member supporting a third valve member for cooperating with the liquid outlet port, and a spring-type valve displacement pin carried on the second valve member for holding the first valve member closed when the collapsible dome is in the expanded state, (e) a dual sealing bond is created when the first valve member and the second valve member seal a rigid container from the vented valve assembly so no fluid can be allowed in the vented valve assembly until first use, and (f) a longitudinal guideway formed on the channel and a follower projecting from the stem member into the guideway for preventing rotation of the stem member.

In some embodiments, a valve assembly may include one or more of the following features: (a) a unitary tubular valve body of a generally cylindrical hollow form and having a liquid inlet end, a second end and a liquid outlet port, said liquid inlet end adapted for connection to a male spout on a wall of the rigid container, said liquid outlet port being exterior to the wall of the rigid container when the liquid inlet end is affixed to the spout, the valve body further including an air vent opening formed through a wall of the tubular valve body leading to a channel affixed to an inner wall of the tubular valve body, the channel having one open end, (b) a first valve member slidingly disposed in said channel and adapted to be moved between a blocking and an open position relative to said one open end of the channel, (c) a collapsible dome member secured to the valve body in covering relation to said second end of the tubular valve body and movable between a compressed and an expanded state, (d) an elongated, generally rigid stem member having a first end attachable to the collapsible dome and a second end joined to a second valve member adapted to cooperate with the liquid inlet end of the tubular valve body for uncovering the liquid inlet end when the collapsible dome is in the compressed state, said stem member supporting a third valve member for cooperating with the liquid outlet port, and a spring-type valve displacement pin carried on the second valve member for holding the first valve member closed when the collapsible dome is in the expanded state, and (e) a longitudinal guideway formed on the channel and a follower projecting from the stem member into the guideway for preventing rotation of the stem member.

IV. DESCRIPTION OF THE DRAWINGS

V. DESCRIPTION OF THE PREFERRED EMBODIMENT

Figure 1:
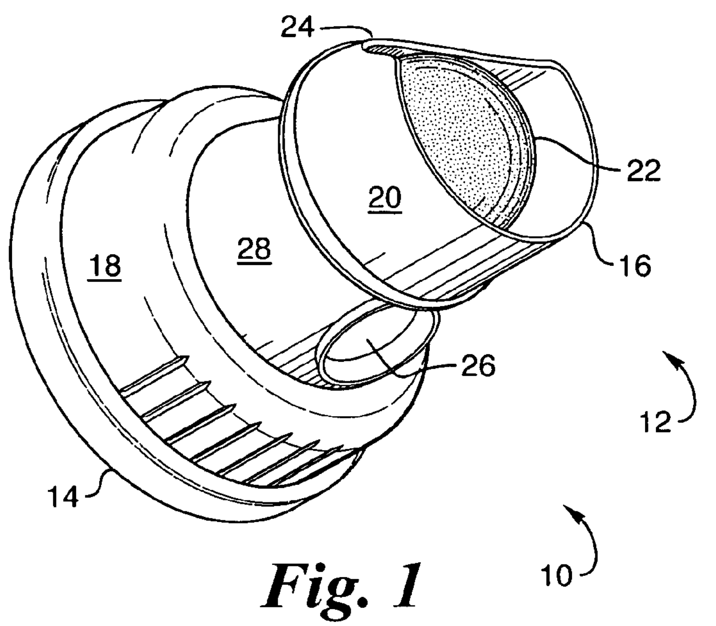
FIG. 1 is a perspective view of the vented valve assembly in an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

In embodiments of the present invention a self-venting valve assembly having four main components, namely, a housing, a bulb-type spring, a reciprocally movable plug and a poppet valve are disclosed. The housing is designed to be attached to the discharge opening of a rigid container. The valve housing includes two flow paths, one permits liquid to exit the container and the other to allow air to enter the container, thereby preventing a vacuum from forming in the container which would otherwise inhibit liquid from exiting the container through the liquid flow path. The housing also includes a shield to inhibit unintended actuation of the bulb-type spring.

The plug includes two valve members, one for the valve body inlet, separating the dispensing valve chamber from the bottle/container and one for the liquid outlet. Each are mounted on a rigid stem designed to be reciprocally movable within the housing upon actuation of the bulb-type spring to open the liquid flow path when the bulb-type spring is compressed and to close off the liquid flow path when the bulb-type spring is released.

A poppet valve is located within the air flow path and is movable between an opened position to permit air flow into the container and a closed position prevents liquid from flowing out of the dispenser through the airflow path. When the two liquid seals are in their closed position, the poppet is held in its closed position by a pin with a spring apparatus projecting from the liquid inlet valve of the plug.

The design is such when the liquid inlet valve and liquid outlet valve are in their open position, the poppet is free to move, but will not move to its open position until pressure within the container is sufficiently less than atmospheric pressure to move the poppet.

The present invention comprises a vented valve assembly for a rigid container which comprises a unitary, tubular, valve body of a generally cylindrical hollow form having a liquid inlet end and a second end. The tubular valve body also includes a liquid outlet port. The liquid inlet end of the valve body is adapted for connection to a spout on a wall of the rigid container whereby the liquid outlet port is exterior to the container's wall when the liquid inlet end is affixed to the spout. The valve body further includes an air vent opening formed through a wall of the tubular valve body leading to a channel affixed to an inner wall of the tubular valve body and where the channel has only one open end. A first valve member is slidingly disposed in the channel and is adapted to be moved between a blocking and an open position relative to said one open end of the channel. A collapsible dome member is secured to the valve body in covering relation to the second end of the tubular valve body and is movable between a compressed and an expanded state. Completing the assembly is an elongated, generally rigid stem member having a first end attachable to the collapsible dome and a second end-joined to a second valve member adapted to cooperate with the liquid inlet end of the tubular valve body for uncovering the liquid inlet end when the collapsible dome is in the compressed state, said stem member supporting a third valve member for cooperating with the liquid outlet port. The second valve member carries a spring-type valve displacement pin on it for holding the first valve member closed when the collapsible dome is in its expanded state.

With reference to FIG. 1, a perspective view of the vented valve assembly in embodiments of the present invention is shown. It is indicated generally by numeral 10 and comprises a valve 12 having a first (liquid inlet) end 14 and a second end 16. The liquid inlet end 14 has an internally threaded collar 18 adapted to be screwed onto an externally threaded spout on a liquid filled container (not shown). The valve body may be molded from a variety of thermoplastics and thermosetting polymers including, but not limited to, polypropylene, polyethylene, polycarbonate, PVC and fluoropolymers.

The second end 16 includes a shroud portion 20 surrounding a compressible elastomeric dome member 22. The shroud includes a cut-out portion 24 allowing a user's finger to better access to the compressible dome 22.

Figure 3:
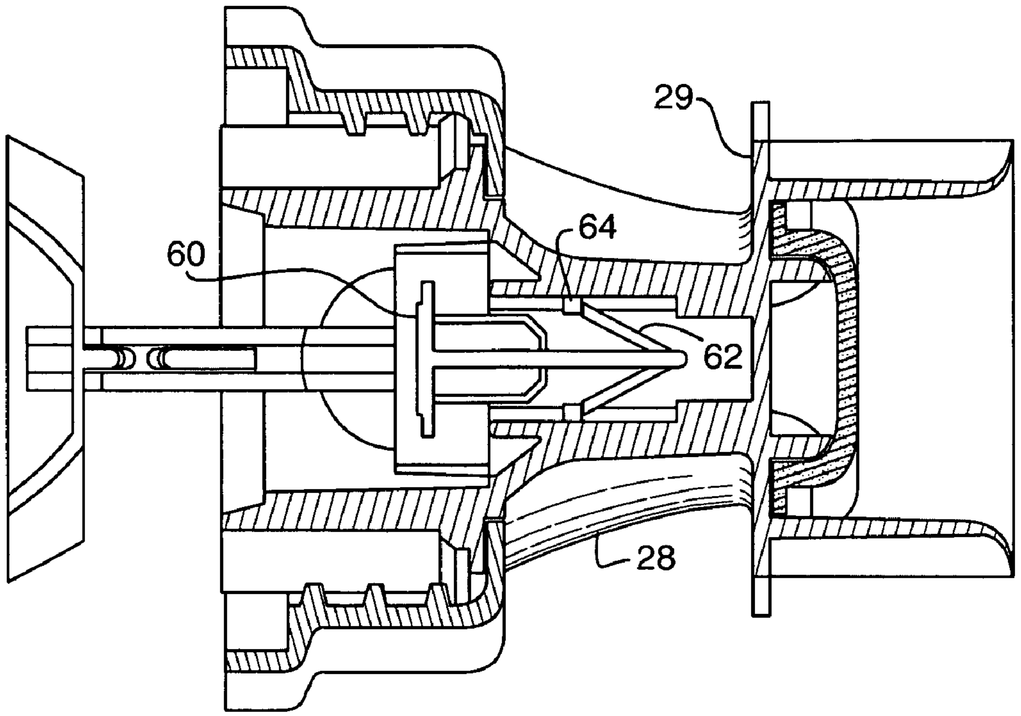
FIG. 3 is a horizontal, longitudinal cross-sectional view of the vented valve assembly with the poppet valve in its open position in an embodiment of the present invention.

Also visible in FIG. 1 is a liquid outlet port 26 located in a throat portion 28 formed in a tubular sidewall of the housing. The throat portion is shaped to better accommodate the user's index finger and middle finger as the thumb is used to compress the dome member 22. More particularly, by indenting the throat portion, more surface of a flange 29 (FIG. 3) is exposed for engagement by the fingertips of the index finger and middle finger.

Figure 2:
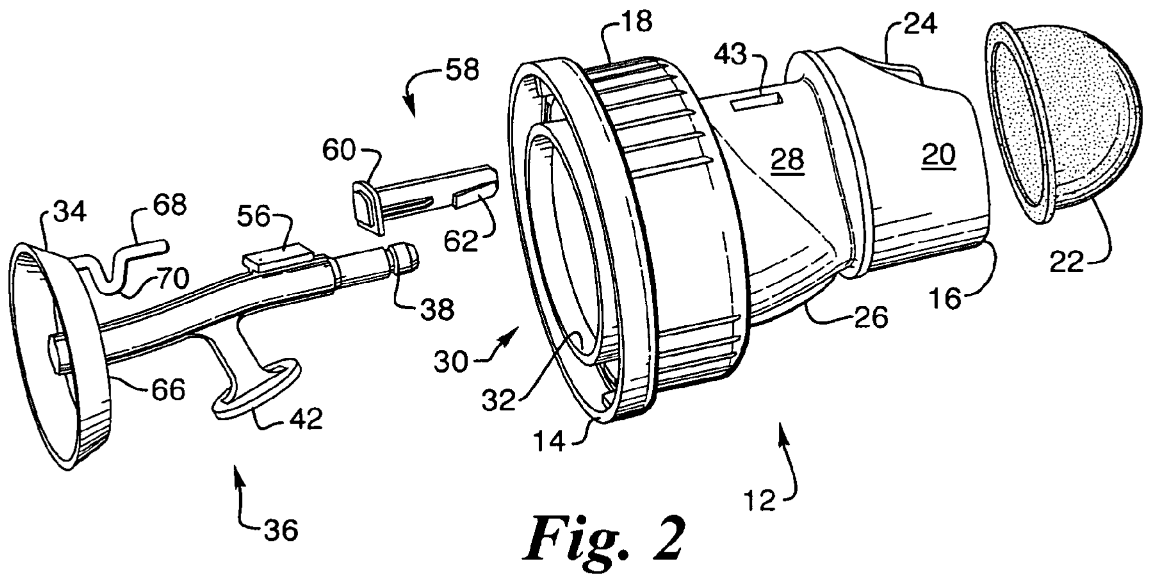
FIG. 2 is an exploded view of the vented valve assembly of FIG. 1.

With reference now to the exploded view of FIG. 2, it can be seen the threaded collar 18 concentrically surrounds a valve seat 30. The collar 18 may be separate from or integrally molded with the valve 12. The valve seat 30 has a tapered annular surface 32 adapted to be closed by a liquid inlet valve member 34 affixed to the end of a rigid molded plastic stem member 36.

Figure 4:
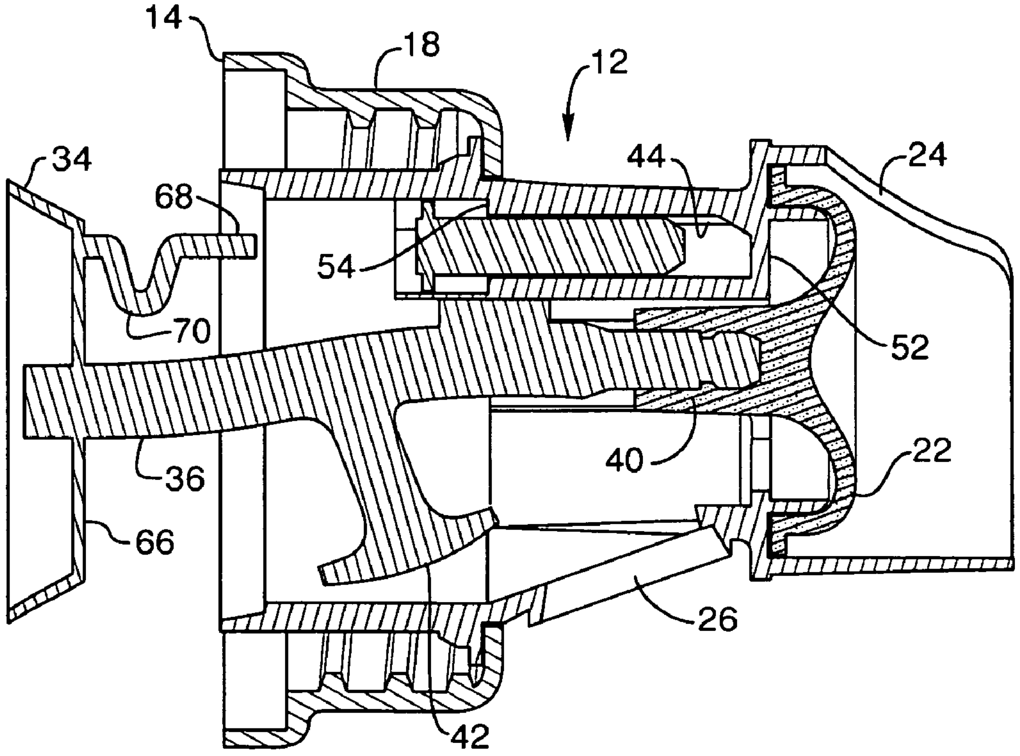
FIG. 4 is a vertical, longitudinal cross-sectional view of the vented valve assembly with the poppet valve in its open position in an embodiment of the present invention.
Figure 5:
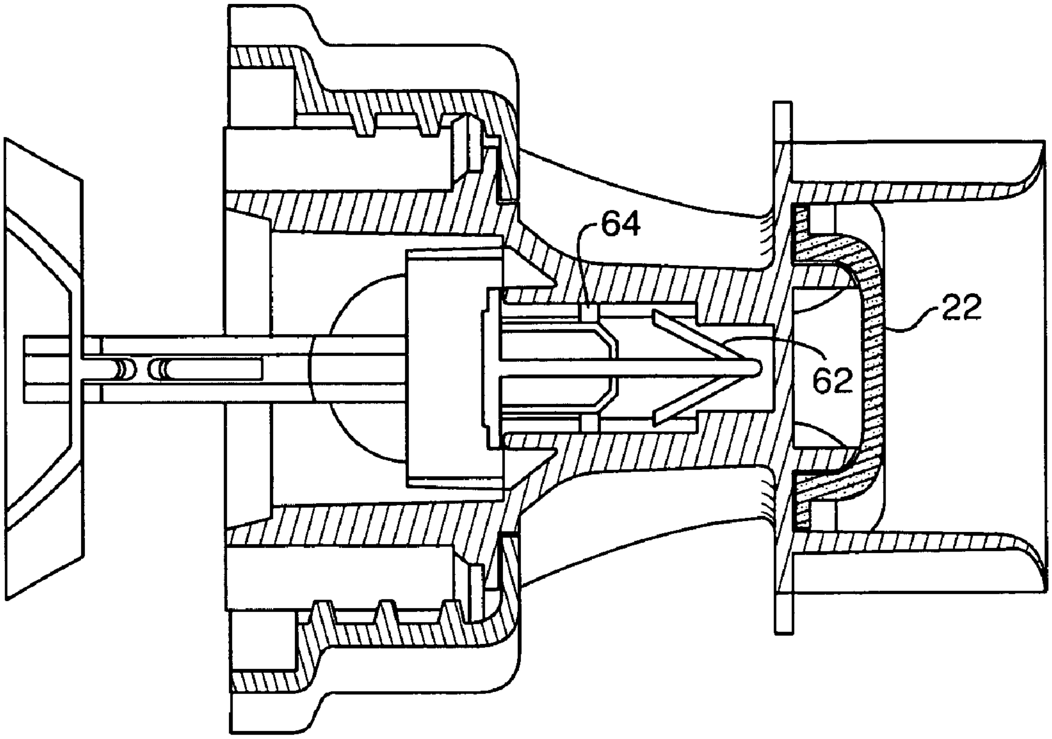
FIG. 5 is a horizontal, longitudinal cross-sectional view of the vented valve assembly with the poppet valve in its closed position in an embodiment of the present invention.

The opposite end of the stem member has a bulbous portion 38 adapted to be plugged into and retained by a tubular socket 40 (FIG. 4) projecting outward form the concave interior surface of the elastomeric dome 22.

Also integrally formed on the stem member 36 is a third valve member 42 adapted to cooperate with the liquid outlet port 26 to keep the outlet port closed when the dome 22 is not being compressed. When the resilient dome is collapsed by a user's thumb pressure, the liquid inlet valve member 34 and the liquid outlet port simultaneously open to allow liquid within the container (not shown) to flow through the valve 12 to the outlet port 26.

An air vent is also formed through the wall of valve 12 in FIG. 2 identified as slit 43.

Figure 6:
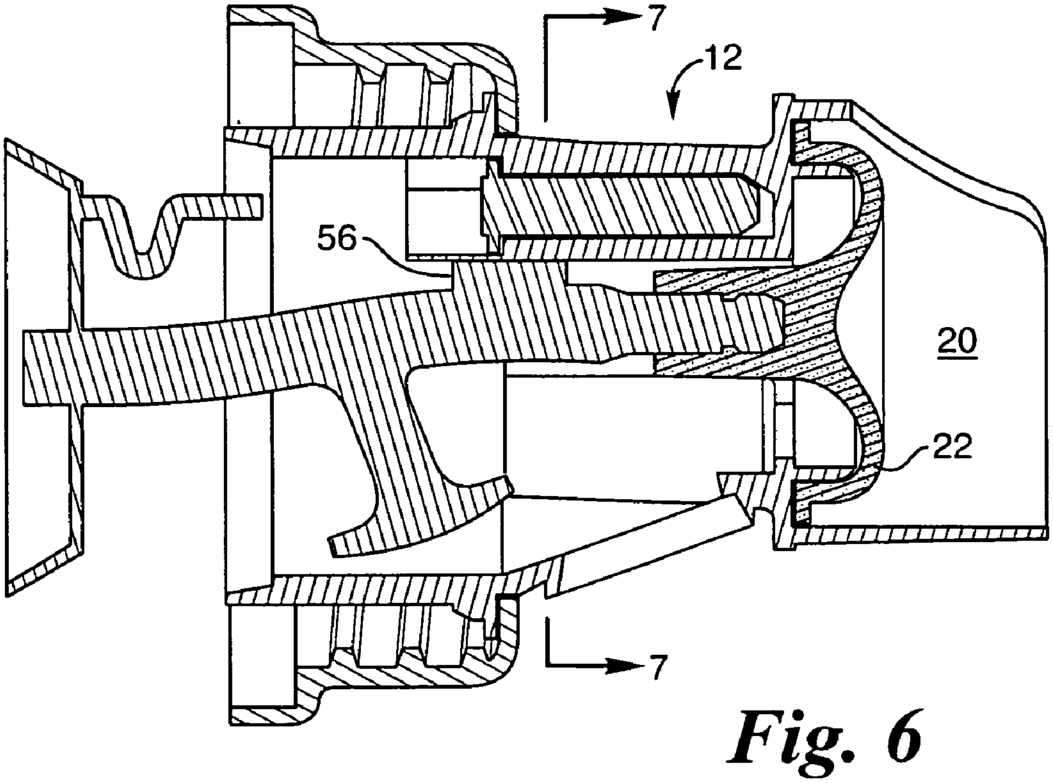
FIG. 6 is a vertical, longitudinal cross-sectional view of the vented valve assembly with the poppet valve in its closed position in an embodiment of the present invention.
Figure 7:
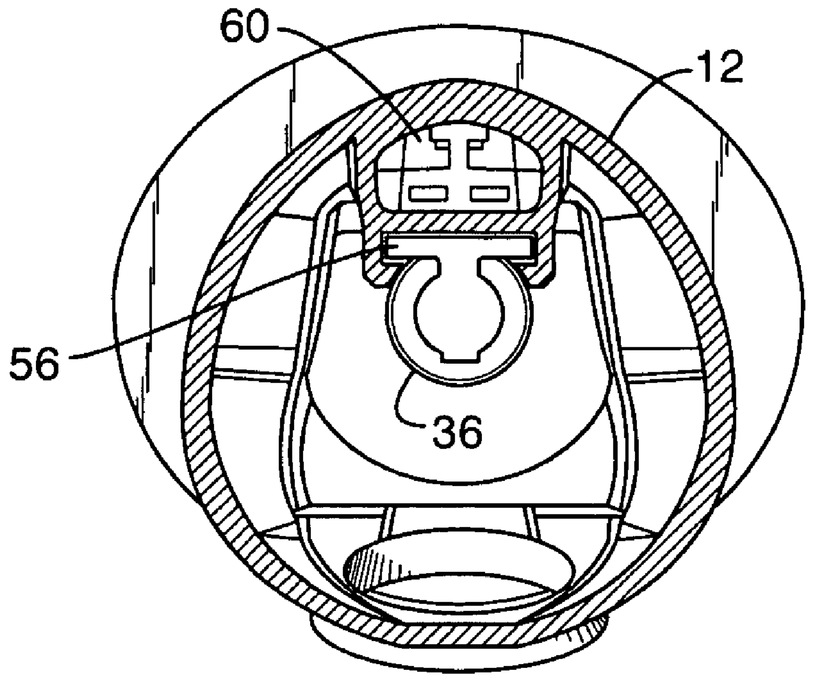
FIG. 7 is a transverse cross-sectional view taken along the line 7-7 in FIG. 6 in an embodiment of the present invention.
Figure 8:
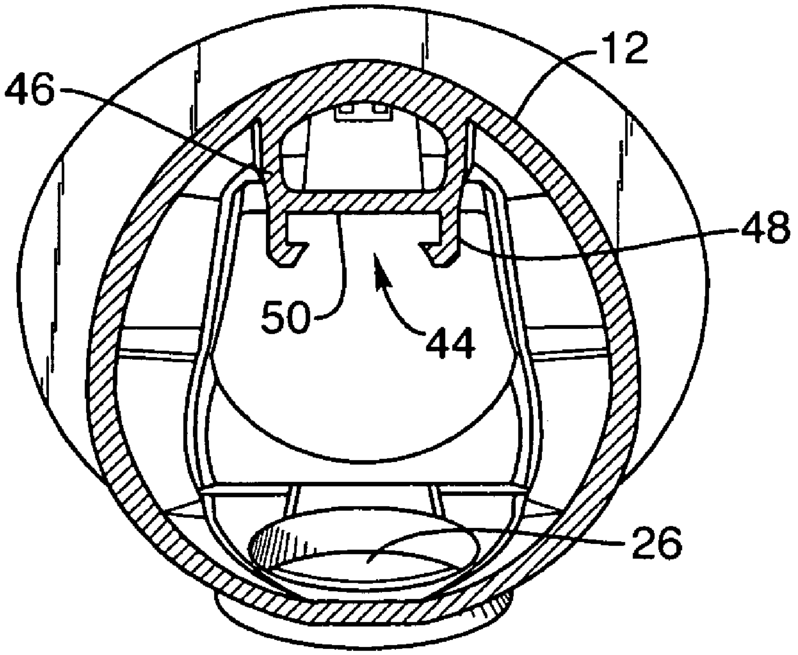
FIG. 8 is a transverse cross-sectional view taken along the line 7-7 in FIG. 6 with the stem removed from the housing in an embodiment of the present invention.

Turning next to the cross-sectional views of FIGS. 6 and 8, a hollow box-like channel 44 is integrally molded to the inside wall of the valve 12. The channel has opposed sidewalls 46 and 48, a mutually perpendicular bottom wall 50, a closed end wall 52 and an open opposite end 54. As seen in FIG. 8, the sidewalls 46 and 48 extend downward below the bottom wall 50 and turn inward toward one another to form a T-slot. This T-slot is adapted to receive a plate-like projection 56 integrally molded with the stem member 36 thereby preventing rotation of the stem member within the valve 12. This assures the third valve member 42 will remain aligned with the liquid outlet port 26 upon depression and release of the elastomeric dome 22 carrying the stem member 36.

The vent 43 formed through the wall of the valve 12 leads to the interior of the channel 44. The exploded view of FIG. 2 shows a poppet valve 58 which is also a molded plastic part and it has a face 60 at one end thereof and a pair of resilient wings, as at 62, extending laterally from opposed sides of the poppet valve 58 at the end opposite from the face 60. The poppet valve 58 is dimensioned to slide into the open end 54 of the channel 44. When pushed into the channel, the wings 62 resiliently expand to engage stops 64 (FIG. 3), thereby retaining the poppet valve within the confines of the channel 44 but allowing it to reciprocate through a predetermined distance whereby the open end 54 of the channel 44 can be covered and uncovered by the face 60.

Integrally molded or otherwise attached to the inner face 66 of the liquid inlet valve member 34 is a valve displacement pin 68 having a loop 70 formed along its length to provide a measure of resiliency to the valve displacement pin.

Having described the constructional features of the vented valve assembly of the present invention, consideration will next be given to its mode of operation.

With the elastomeric dome 22 uncompressed, the stem member 36 will have been pulled rightward when viewed in FIGS. 3 through 6 by the spring action of the dome so the liquid inlet valve member 34 will be seated in the tapered surface 32 of the valve seat 30 of the valve assembly and the third valve member 42 will be likewise seated with respect to the liquid outlet port 26. Further, the resilient valve displacement pin 68 will have engaged the face 60 of the poppet valve 58 pushing it closed relative to the open end 54 of the air vent channel 44. When in this state, liquid within the container with which the vented valve assembly of FIG. 1 is used will be blocked from entering the dispenser chamber and fluid in the dispenser chamber will be blocked from exiting the outlet port 26 and the vent slits 43.

Now, when a user's finger pressure is used to collapse the dome 22 in the manner shown in FIGS. 3 through 6, valves 34 and 42 affixed to the stem member 36 will simultaneously open with respect to their valve seat surface 32 and outlet port 26, and the poppet valve displacement pin 68 will disengage from its contact with the poppet valve face 60. As liquid in the container begins to exit the outlet port 26, a partial vacuum is created within the container, causing air to flow through the vent slits 43 and act upon the poppet valve 58, causing it to open relative to the open end 54 of the channel 44 and allow air to flow into the container to thereby equalize the pressure and allow a steady stream of liquid to flow through the valve body and out its outlet port 26. During the time the negative pressure is being created within the container following initial opening of the valves 34 and 42, the poppet valve remains closed. None of the liquid is able to flow through the channel 44 and exit the air vent openings 43.

After a desired quantity of the liquid has been dispensed, the user releases the resilient elastomeric dome 22, and the stem member 36 is again drawn rightward when viewed in the drawings, reclosing the valves 34 and 42 and the poppet valve 58.

As earlier mentioned, the engagement of the plate 56 in the T-slot formed on the undersurface of the channel 44 precludes rotation of the stem member 36 and insures the valve displacement pin 68 carried on the liquid inlet valve member 34 will remain aligned with the poppet valve 58 to push air-actuated poppet valve to its closed condition upon release of thumb pressure on the elastomeric dome 22.

Thus, embodiments of the VENTED VALVE ASSEMBLY are disclosed. One skilled in the art will appreciate the present teachings can be practiced with embodiments other than those disclosed. The disclosed embodiments are presented for functions of illustration and not limitation, and the present teachings are limited only by the claims follow.

What is claimed is:

1. A vented valve assembly for attachment to a rigid container comprising:

(a) a unitary tubular valve body of a generally cylindrical hollow form and having a liquid inlet end, a second end and a liquid outlet port, said liquid inlet end adapted for connection to a male spout on a wall of the rigid container, said liquid outlet port being exterior to the wall of the rigid container when the liquid inlet end is affixed to the spout, the valve body further including an air vent opening formed through a wall of the tubular valve body leading to a channel affixed to an inner wall of the tubular valve body, the channel having one open end;

(b) a first valve member slidingly disposed in said channel and adapted to be moved between a blocking and an open position relative to said one open end of the channel;

(c) a collapsible dome member secured to the valve body in covering relation to said second end of the tubular valve body and movable between a compressed and an expanded state; and (d) an elongated, generally rigid stem member having a first end attachable to the collapsible dome and a second end joined to a second valve member adapted to cooperate with the liquid inlet end of the tubular valve body for uncovering the liquid inlet end when the collapsible dome is in the compressed state, said stem member supporting a third valve member for cooperating with the liquid outlet port, and a spring-type valve displacement pin carried on the second valve member for holding the first valve member closed when the collapsible dome is in the expanded state.

2. The vented valve assembly of claim 1, wherein the second valve member and the third valve member simultaneously move to uncover the liquid inlet end and the liquid outlet port upon compression of the collapsible dome.

3. The vented valve assembly of claim 1, and further comprising a longitudinal guideway formed on the channel and a follower projecting from the stem member into the guideway for preventing rotation of the stem member.

4. The vented valve assembly of claim 1, wherein the valve body includes a radially extending flange proximate the second end.

5. The vented valve assembly of claim 4, and further comprising finger accommodating indentations in said wall of the tubular valve body adjacent to said flange.

6. The vented valve assembly of claim 4, wherein the tubular valve body and said channel are integrally injection molded of a rigid plastic selected from a group consisting of polypropylene, polyethylene, polycarbonate and blends thereof.

7. The vented valve assembly of claim 3, wherein the valve displacement pin is resiliently affixed to a back surface of said second valve member and the follower in the guideway maintains alignment of the pin with the first valve member.

8. The vented valve assembly of claim 1, wherein the first valve member is moved to its open position by air pressure.

9. A vented valve assembly, comprising:

(a) a unitary tubular valve body of a generally cylindrical hollow form and having a liquid inlet end, a second end and a liquid outlet port, said liquid inlet end adapted for connection to a male spout on a wall of the rigid container, said liquid outlet port being exterior to the wall of the rigid container when the liquid inlet end is affixed to the spout, the valve body further including an air vent opening formed through a wall of the tubular valve body leading to a channel affixed to an inner wall of the tubular valve body, the channel having one open end;

(b) a first valve member slidingly disposed in said channel and adapted to be moved between a blocking and an open position relative to said one open end of the channel;

(c) a collapsible dome member secured to the valve body in covering relation to said second end of the tubular valve body and movable between a compressed and an expanded state;

(d) an elongated, generally rigid stem member having a first end attachable to the collapsible dome and a second end joined to a second valve member adapted to cooperate with the liquid inlet end of the tubular valve body for uncovering the liquid inlet end when the collapsible dome is in the compressed state, said stem member supporting a third valve member for cooperating with the liquid outlet port, and a spring-type valve displacement pin carried on the second valve member for holding the first valve member closed when the collapsible dome is in the expanded state; and (e) a dual sealing bond is created when the first valve member and the second valve member seal a rigid container from the vented valve assembly so no fluid can be allowed in the vented valve assembly until first use.

10. The vented valve assembly of claim 9, wherein the second valve member and the third valve member simultaneously move to uncover the liquid inlet end and the liquid outlet port upon compression of the collapsible dome.

11. The vented valve assembly of claim 9, and further comprising a longitudinal guideway formed on the channel and a follower projecting from the stem member into the guideway for preventing rotation of the stem member.

12. The vented valve assembly of claim 9, wherein the valve body includes a radially extending flange proximate the second end.

13. The vented valve assembly of claim 9, wherein minimal fluid is captured in the valve assembly after usage.

14. The vented valve assembly of claim 9, wherein the second valve member seals the liquid outlet port from any fluid in the vented valve assembly.

15. A valve assembly, comprising:

(a) a unitary tubular valve body of a generally cylindrical hollow form and having a liquid inlet end, a second end and a liquid outlet port, said liquid inlet end adapted for connection to a male spout on a wall of the rigid container, said liquid outlet port being exterior to the wall of the rigid container when the liquid inlet end is affixed to the spout, the valve body further including an air vent opening formed through a wall of the tubular valve body leading to a channel affixed to an inner wall of the tubular valve body, the channel having one open end;

(b) a first valve member slidingly disposed in said channel and adapted to be moved between a blocking and an open position relative to said one open end of the channel;

(c) a collapsible dome member secured to the valve body in covering relation to said second end of the tubular valve body and movable between a compressed and an expanded state;

(d) an elongated, generally rigid stem member having a first end attachable to the collapsible dome and a second end joined to a second valve member adapted to cooperate with the liquid inlet end of the tubular valve body for uncovering the liquid inlet end when the collapsible dome is in the compressed state, said stem member supporting a third valve member for cooperating with the liquid outlet port, and a spring-type valve displacement pin carried on the second valve member for holding the first valve member closed when the collapsible dome is in the expanded state; and (e) a longitudinal guideway formed on the channel and a follower projecting from the stem member into the guideway for preventing rotation of the stem member.

16. The valve assembly of claim 15, wherein the valve body includes a radially extending flange proximate the second end and further includes a finger accommodating indentations in said wall of the tubular valve body adjacent to said flange.

17. The valve assembly of claim 16, wherein the tubular valve body and said channel are integrally injection molded of a rigid plastic selected from a group consisting of polypropylene, polyethylene, polycarbonate and blends thereof.

18. The valve assembly of claim 16, wherein the valve displacement pin is resiliently affixed to a back surface of said second valve member and the follower in the guideway maintains alignment of the pin with the first valve member.

19. The valve assembly of claim 18, wherein the valve displacement pin resiliently affixed to the back surface has a spring-type function to ensure sealing force over varying manufacturing tolerances.

20. The valve assembly of claim 19, wherein the spring-type function also closes an air return poppet prior to complete sealing of the first valve member seal.

* * * * *